UNITED STATES PATENT OFFICE.

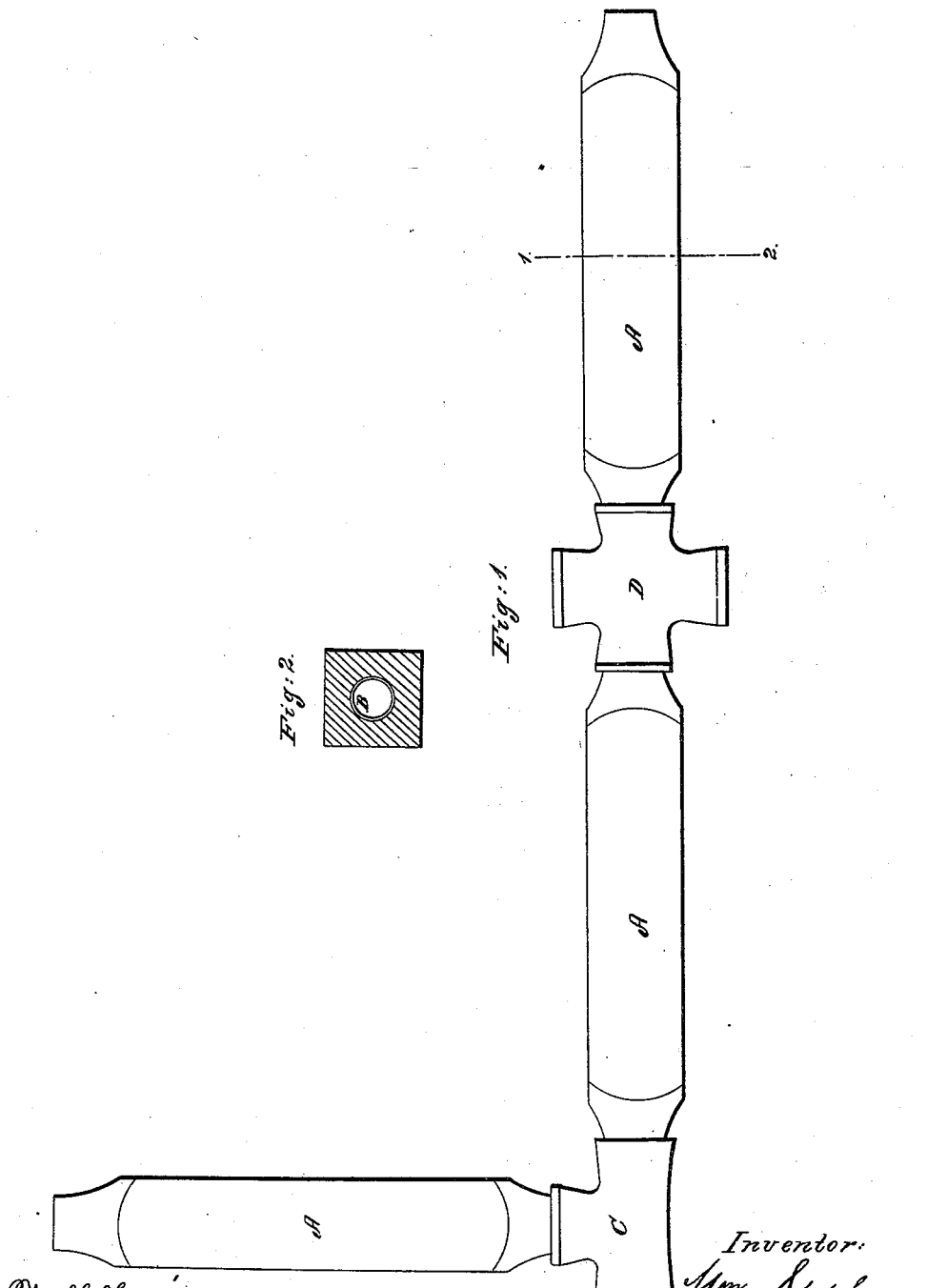

WM. STEPHENSON, OF GALION, OHIO.

GAS-PIPE.

Specification of Letters Patent No. 29,111, dated July 10, 1860.

*To all whom it may concern:*

Be it known that I, WILLIAM STEPHENSON, of Galion, in the county of Crawford and State of Ohio, have invented a new and Improved Gas-Pipe; and I do hereby declare that the following is a full and exact description thereof, reference being had to the accompanying drawings, in which—

Figure 1, is a plan view, and Fig. 2, is a transverse section.

The nature of my invention consists in employing wood gas pipes, instead of metal pipes as heretofore used; coating the inside of the pipes with a composition of sulfur and graphite, or its equivalent, for the purpose of preventing leakage.

In making and preparing my gas-pipes I use walnut, poplar, or any other wood that will not crack by drying. I take 5 by 5 inch for 2 inch bore; 6 by 6 inch for 3 inch bore; 7 by 7 inch for 4 inch bore, &c.

The pipes are bored in any of the modes commonly in use for boring ordinary wood pipe. The wood is kiln-dried, to season it. Next, the connections C, D, are fitted, after which I oil the outside of the pipes A, A, A, with crude coal oil.

In preparing the composition, I melt the brimstone in a kettle and mix the graphite in, while hot, using only so much of each as will mix together and form a solid coating.

In coating I simply pour the mixture into the pipe, when a sufficient quantity will usually adhere to the inside to form a perfect coating. After the pipes have cooled they are tested, and if they are found to be deficient, a new application of the coating mixture is made. I then coat the outside of the pipe with hot coal-tar or pitch, to prevent decay when laid in damp places, and to form a further protection from all disturbing causes; this finishes the preparation of the pipe.

The connections are the same as are commonly in use.

In laying the pipe I take candle wicking well saturated in oil and lead paint, wrap the ends of the pipe with it, and drive the pipe into the socket of the connective.

The advantages of this pipe over all other gas-pipes, are; the leakage is comparatively nothing, owing to the fact that there is no contraction or expansion of the material, as is the case with iron; this pipe is more easily handled and transported, with less expense attending the transportation; the lengths can be made more extended, thereby rendering fewer connections necessary. And finally the total cost of manufacturing and laying the wooden pipes ready for use, will not equal one half the cost of the pipes now in use.

What I claim as new and desire to secure by Letters Patent, is—

A wooden gas pipe A, coated on the inside with a composition of graphite and sulfur, or its equivalent.

WM. STEPHENSON.

Witnesses:
E. F. DICKINSON,
J. S. STEPHENSON.